F. G. McPHERSON.
LIGHTING MEANS FOR AUDITORIUMS AND OTHER PLACES.
APPLICATION FILED FEB. 20, 1915.
1,176,475.
Patented Mar. 21, 1916.
2 SHEETS—SHEET 1.
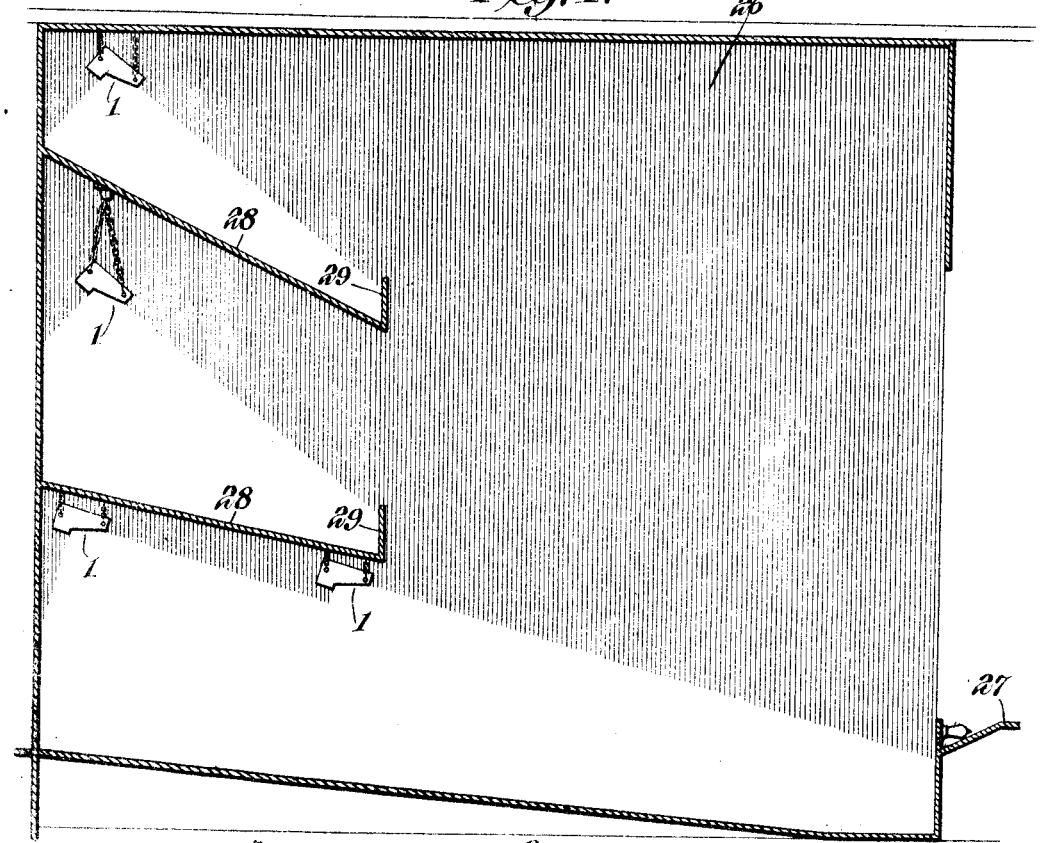
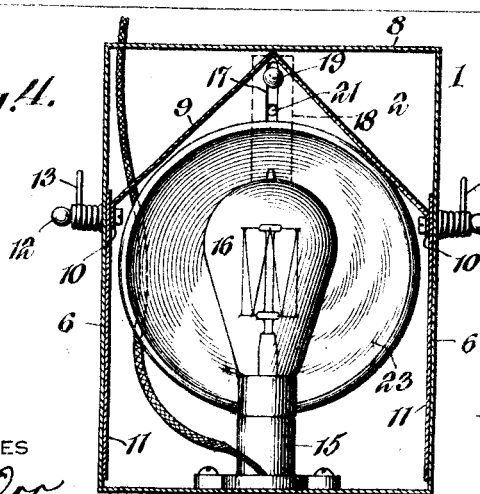
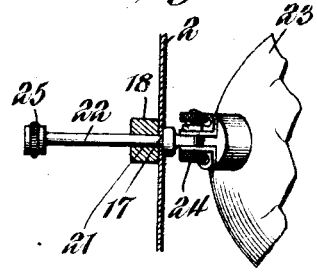
WITNESSES
Frank G. McPherson
INVENTOR,
BY
ATTORNEY

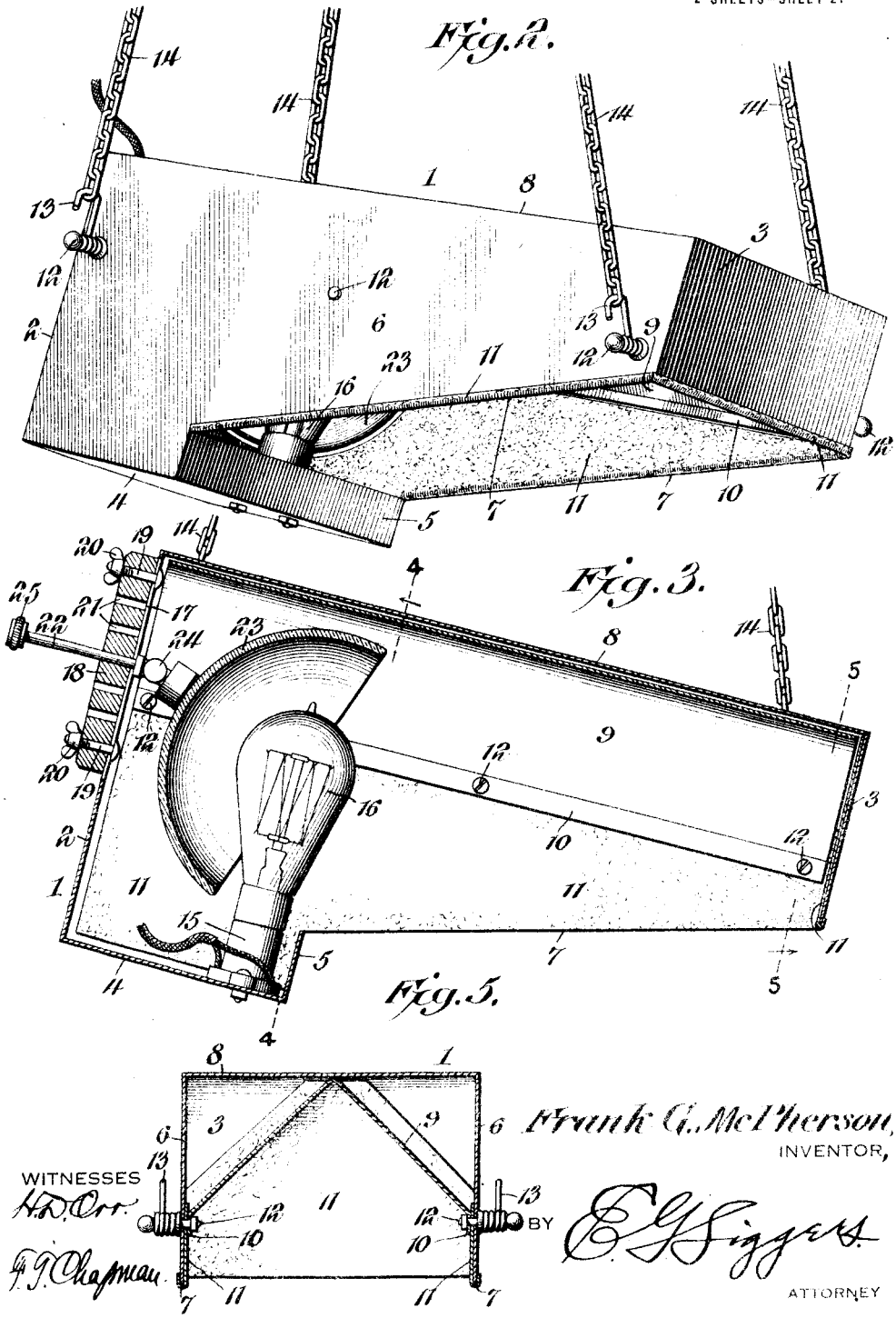

UNITED STATES PATENT OFFICE.

FRANK G. McPHERSON, OF BEAVER FALLS, PENNSYLVANIA, ASSIGNOR TO SHADO-LITE MFG. CO., INC., OF BEAVER FALLS, PENNSYLVANIA, A CORPORATION OF PENNSYLVANIA.

LIGHTING MEANS FOR AUDITORIUMS AND OTHER PLACES.

1,176,475.  Specification of Letters Patent.  Patented Mar. 21, 1916.

Application filed February 20, 1915. Serial No. 9,650.

*To all whom it may concern:*

Be it known that I, FRANK G. MCPHERSON, a citizen of the United States residing at Beaver Falls, in the county of Beaver and State of Pennsylvania, have invented a new and useful Lighting Means for Auditoriums and other Places, of which the following is a specification.

This invention has reference to lighting means for auditoriums, etc., and its object is to furnish ample light to that part of the auditorium occupied by the audience without obtruding the light so furnished upon that portion of the auditorium toward which the eyes of the audience are directed.

In motion picture theaters in which a screen is employed at one end, in ordinary theaters where a stage is provided at one end, and in other auditoriums where a platform or the like is provided at one end, it is desirable to bring that end of the auditorium toward which the eyes of the audience are directed into prominence and it is the usual custom to so darken the auditorium or to so dimly light it that the little light that may be present does not interfere with the desired prominence of that portion of the auditorium toward which the eyes of the audience are directed, and which is then sufficiently light to bring it into distinct prominence. In the case of the motion picture auditorium the screen is the part to be viewed.

By the present invention the portion of the auditorium occupied by the audience is at all times well lighted, but the lighting is not permitted to reach the screen, stage or other part of the auditorium toward which the attention of the audience is to be directed, wherefore the attention of the audience is not distracted from the screen or stage, since the view of such parts of the auditorium is not dimmed by the light employed to illuminate that part of the auditorium occupied by the audience.

It has been the custom to either extinguish practically all the lights used to illuminate the audience part of the auditorium when in ordinary theaters the performance is going on upon the stage, and it is the custom in motion picture theaters to employ as little light as possible in the audience part of the auditorium so as to avoid dimming the screen and the picture there displayed. In the motion picture theater the condition
is sometimes compromised by employing a stronger illumination in the audience part of the auditorium which results in a corresponding illumination of the screen and then in a measure overcoming such illumination by the use of a much stronger illuminating means in the projecting apparatus, thus adding materially to the cost of operation.

With the present invention it is possible to so illuminate the audience part of the auditorium even to a point adjacent to the screen end of the auditorium to such an extent that members of the audience may quite easily read ordinary print, while at the same time the effect of the illumination is not materially apparent upon the screen and the latter is in a sufficiently dense shadow to permit a much weaker illumination on the screen of the picture in order to make it more clearly and prominently visible than has heretofore been possible even when the auditorium has been dimly illuminated.

The invention will be best understood from a consideration of the following detailed description, taken in connection with the accompanying drawings forming a part of this specification with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a schematic representation of the auditorium of an ordinary theater provided with a stage and showing the application of the present invention thereto. Fig. 2 is a perspective view of an illuminating element as seen from below. Fig. 3 is a longitudinal vertical central section of the illuminating element of Fig. 2. Fig. 4 is a section on the line 4—4 of Fig. 3. Fig. 5 is a section on the line 5—5 of Fig. 3. Fig. 6 is a detail cross-section of the reflector support.

Referring first to Figs. 2 to 6 there is shown a casing 1 which may be of generally rectangular contour, and this casing may also be considerably longer than broad, while it varies considerably in depth.

Considering the casing as in the operative position it has a closed rear end wall 2 extending the full depth of the casing, and a front wall 3 of considerably less depth. Extending forwardly from the bottom of the rear wall 2 is a bottom wall 4 terminating in a low upstanding front portion or wall 5 spaced from the rear wall 2 by a distance considerably less than half the length of the casing. From the top of the wall 5 toward the front wall 3 the sides 6 of the casing are of progressively lessening width until the front wall 3 is reached, so that these side walls 6 each has its bottom edge 7 slanting from the rear toward the front. The casing 1 has a closed top 8 while the bottom from the wall 5 to the wall 3 is freely open.

Secured within the casing 1 immediately beneath the top 8 is a longitudinally disposed reflector 9 usually of white enameled metal, but this reflector may be made of any suitable material whereby light reaching it from a suitable source is diverted into another path. In the particular showing of the drawings the reflector 9 is of inverted V-shape with the sides of the V at approximately right angles one to the other and the apex of the V closely adjacent to the under face of the top 8 at about its longitudinal center line. The reflector may, therefore, be described as having divergent reflecting surfaces extending lengthwise of the casing, but this does not preclude the use of other types of reflectors. The longitudinal margins of the reflector 9 are in the form of flanges 10 lying flat against the inner surfaces of the side walls 6 at a distance above the inclined lower margin 7 of these walls. Since it is customary to make the casing 1 of sheet metal it is advisable to cover those portions of the inner surface of the casing 1 at points below the reflector 9 with some fibrous or non-reflective material indicated at 11, and this material may consist of cloth or the like cemented or otherwise secured to the inner walls of the casing 1 at all points where there is any liability of distracting reflections.

In order to secure the reflector 9 in the casing, bolts 12 are passed through the flanges 10 and the walls 6, and these bolts may be located at the ends of the reflector and at intermediate points. Those bolts at the ends of the reflector correspond in position to the ends of the casing 1 and the bolts are there continued through and beyond the side walls 6 of the casing and have hooks 13 applied to them for the purpose of receiving suspension chains 14 permitting the hanging of the casing 1 from the ceiling of the auditorium, or of galleries or the like therein. The chains 14 may be such as are customarily employed in electric lighting units of the suspended type and provide both an ornamental and a useful means for carrying the casings when at the desired height and inclination, since both the height and inclination of these casings must be varied under differing circumstances.

Secured to the bottom wall 4 within the space defined between the back wall 2 and intermediate wall 5 is a socket 15 such as is customarily employed for the reception of an incandescent electric lamp, one of which is shown at 16. Usually a single incandescent lamp 16 of suitable power is all that is needed, but this does not preclude the use of a group of lamps if such be found desirable. In most instances a hundred watt tungsten lamp is all that is needed for each lighting unit 1, but higher or lower power lamps may be used as circumstances demand. Through the rear wall 2 there is produced an elongated upright slot 17 which in most part may be above the longitudinal middle line of the casing 1. This slot is covered by an elongated block 18 applied to the exterior of the wall 2 and there held by bolts 19 extending through the block near the ends and also through the slot 17. By supplying these bolts 19 with wing nuts 20 or other similar nuts, the block 18 may be adjusted up and down the back wall 2 of the casing 1, the slot 17 being long enough for the purpose. The block 18 is traversed by a longitudinal series of holes 21 any one of which may receive a rod 22 carrying at one end a reflector 23 by means of a jointed connection 24, and this reflector may be readily adjusted from the exterior by providing the rod 22 at the end remote from the reflector with a milled nut or head 25. The reflector 23 is lodged within that end of the casing defined between the walls 2 and 5 and in suitable relation to the lamp, so that there is projected through the open bottom of the casing 1 a forward beam of light. The reflector 23 is shown as of semi-spherical shape, but it will be understood that this reflector may be of any other suitable shape, whereby the light is directed forwardly through the open bottom of the box or casing. The major portion of the light of the lamp 16 is projected forwardly, but more or less of the light finds its way downwardly because of the reflector 9 and some of the light is also directed rearwardly of the lighting unit 1 as permitted by the wall 5, which latter, however, hides from view the lamp 16 and reflector 23, and also hides all view of the lamp socket 15.

The inclined edges 7 of the side walls 6 provide for a side spread of the light without the liability of this side spread reaching up along the side walls of the auditorium in a manner to cause reflections which might illuminate portions of the auditorium which it is desired to keep dim.

The effect of the lighting unit of the present invention is quite similar to that more or less schematically indicated in Fig. 1, where there is represented an auditorium 26 of a theater or other place provided with a stage 27 and galleries 28. It will be understood, of course, that the showing of the auditorium 26 is without any attempt at proportions and may be taken as representative either of an ordinary theater having a stage 27, or a motion picture theater where the stage is replaced by a screen on which the motion pictures are displayed, or of any auditorium where it is desired that the portion represented by the stage 27 shall be viewed by the audience without being affected by the means of supplying light to that portion of the auditorium occupied by the audience.

In a lighting problem such as presented in Fig. 1 lighting units 1 are suspended from the ceiling under the first gallery, from the ceiling under the second gallery, and from the ceiling of the auditorium since two galleries are indicated.

With respect to the galleries 28 it is not desirable that any light used in the illumination of the galleries shall extend beyond the front railing 29 of these galleries, while in the case of the floor portion of the auditorium the lighting should extend to the stage, but not on to the stage. For this reason lighting units 1 are suspended from the ceiling underneath the lower gallery close to the front thereof, so that the light may be projected over the audience toward the stage, while the rear portion of the floor of the auditorium is illuminated by other units 1 placed under the rear of the lower gallery. In the galleries themselves the lighting units may be placed near the rear wall. In each instance the lighting units 1 are so tipped with respect to their length that the shadow cast by the lower edge of the front wall 3 will not rise quite as high as the stage, or as the top of the railings 29 of the galleries. Since in ordinary theaters it is quite common to extend the galleries around the sides of the auditorium as many lighting units 1 are provided as may be needed and the same is true as to the lighting of the main floor of the auditorium in ordinary theaters provided with stages, such auditoriums being quite wide with respect to their length. Many motion picture auditoriums are, however, quite narrow and much longer than wide. In such case the lighting units are disposed as needed at different points along the length of the auditorium, but are tipped so that the edge of the shadow cast by the lower edge of the front wall 3 at no time reaches onto the screen. Such shadow line is very marked and the light produced by each lighting element is very strictly localized both by the bottom edge of the front wall 3 as to forward projection, and by the bottom edge 7 of the side walls 6 as to lateral projection. In no instance should the line of demarcation between the light and shadow rise high enough to cause diffusion of light through the auditorium in a manner to in any way materially dim the screen or stage or the like. Since the lighting units are placed above the audience part of the auditorium, and in most instances well to the rear, it is the backs of the audience and the backs of the seats which are illuminated, while the screen or stage, when neither is lighted up, is cast into a markedly deep shadow. Actual experience has shown that it is quite easy to read a book or newspaper within the space occupied by the audience because of the illumination due to the presence of the illuminating units of the present invention, but the screen or stage, if not lighted up, is scarcely visible, while to the eyes of the audience the seeming dimness of the unilluminated portion of the auditorium is accentuated. The result of this is that the auditorium where occupied by the audience is well lighted, and a person entering the auditorium from a brilliantly lighted exterior, is able to see quite distinctly without waiting for the eyes to become accustomed to the lighting of the auditorium.

In the ordinary theater it is customary to completely darken the auditorium in order to permit various stage effects, especially where the stage is to be dimly lighted, and which effects would be entirely lost if the auditorium were illuminated sufficiently to affect the stage lighting. In motion picture theaters where the audience is constantly changing, lighting of the auditorium to some extent is demanded, and by the means usually employed for the purpose the screen is correspondingly illuminated by the lighting schemes provided in the auditorium portion of the theater. Consequently in motion picture theaters a marked intensification of the light at the projecting apparatus is necessary. Thus the running expenses of the theater are increased without even then obtaining a satisfactory illumination of the audience part of the auditorium.

With the present invention the audience portion of the auditorium is far more brilliantly illuminated than is customary without to any noticeable extent affecting either the stage or the screen as the case may be, and in the case of motion picture theaters permitting a lowering of the intensity of the light at the projection apparatus, thus correspondingly lessening the running expenses of the theater.

The present invention is an improvement upon the illuminating element shown, described and claimed in Letters Patent No. 1,124,635, granted to me on January 12, 1914, for lighting means for motion picture auditoriums.

The lighting unit is useful in other places than motion picture and other theaters, for it may be used in factories, bowling alleys, and many other places. Therefore, the word auditorium as used in the claims is to be considered as comprehending any place where the lighting unit is useful.

What is claimed is:

1. An illuminating element for an auditorium comprising an elongated box or casing of opaque material closed at the top, sides and ends, and at the bottom for a fractional portion of the length of the casing, with the lower margins of the sides of the box from the closed bottom toward the other end of the casing inclined, a light-giving means lodged in that portion of the box provided with the closed bottom, elongated reflecting means within the casing extending lengthwise of the box or casing adjacent to the top thereof, and means for supporting the illuminating element in position to light the floor of the auditorium and to place other parts of the auditorium in the shadow produced by the opaque top, sides and end of the casing remote from the light-giving means.

2. An illuminating element for an auditorium comprising an elongated box or casing of opaque material closed at the top, sides and ends, and at the bottom for a fractional portion of the length of the casing, with the lower margins of the sides of the box from the closed bottom toward the other end of the casing inclined, a light-giving means lodged in that portion of the box provided with the closed bottom, elongated reflecting means within the casing extending lengthwise of the box or casing adjacent to the top thereof, and means for supporting the illuminating element in position to light the floor of the auditorium and to place other parts of the auditorium in the shadow produced by the opaque top, sides and end of the casing remote from the light-giving means, said casing also containing a reflector associated with the light-giving means to project light forwardly from the box or casing through the open bottom thereof.

3. An illuminating element for auditoriums comprising an elongated box or casing of opaque material closed at the top, sides and ends with one end of greater depth than the other and such end of greater depth being provided with a closed bottom extending for a fractional portion of the length of the box toward the end of less depth, and the sides of the box being inclined from the termination of the portion provided with the closed bottom to the end of less depth, light-giving means in that portion of the box or casing provided with the closed bottom, and reflecting means within the box extending lengthwise thereof adjacent to the inner wall of the top of the box and dropping to a lower line along the sides of the box.

4. An illuminating element for auditoriums comprising an elongated box or casing of opaque material closed at the top, sides and ends with the end constituting the front end of the box of less depth than the other end and the end of greater depth being provided with a forwardly projecting bottom portion terminating in an upstanding wall with the sides of the box inclined from the last-named wall to the front of the box, a light-giving means lodged in the portion of the box provided with the bottom, divergent reflectors within the box adjacent to the top portion thereof and extending lengthwise of the box, and reflecting means associated with the light-giving element for directing light therefrom through the open bottom of the box.

5. An illuminating element for auditoriums comprising an elongated box or casing of opaque material closed at the top, sides and ends with the end constituting the front end of the box of less depth than the other end and the end of greater depth being provided with a forwardly projecting bottom portion terminating in an upstanding wall with the sides of the box inclined from the last-named wall to the front of the box, a light-giving means lodged in the portion of the box provided with the bottom, divergent reflectors within the box adjacent to the top portion thereof and extending lengthwise of the box, and reflecting means associated with the light-giving element for directing light therefrom through the open bottom of the box, said reflecting means being provided with a support adjustable as to height, and the box having suspending means associated with the box for varying its longitudinal inclination.

6. An illuminating element for auditoriums comprising an elongated box or casing of opaque material closed at the top, sides and ends and having a closed bottom extending for a fractional portion of the distance from the rear end toward the front and said rear end of the box being of greater depth than the front end with the front edge of the fractional bottom of the box provided with an upstanding wall and the sides of the box having the lower edges inclined from the upper edge of said upstanding wall to the front wall of the box, divergent reflectors extending within the box longitudinally thereof in close relation to the under surface of the top of the box, light-giving means within that portion of the box provided with the closed bottom, a reflector associated with the light-giving means for directing light through the open bottom of the box, and suspending means for the box for sustaining any desired degree of inclination.

7. An illuminating means for auditoriums comprising an elongated box or casing with illuminating means housed in one end and with the bottom portion of the box open from the housing part toward the other end, said box being provided with longitudinally disposed plane reflectors diverging from the longitudinal center line of the top of the box toward the lower edges, and a concave reflector associated with the illuminating means for directing light forwardly through the open bottom of the box.

8. An illuminating means for auditoriums comprising an elongated box or casing with illuminating means housed in one end and with the bottom portion of the box open from the housing part toward the other end with the depth of the box decreasing toward said other or forward end, longitudinally-disposed plane divergent reflectors within the box with meeting edges of the reflectors in the longitudinal center line of the top of the box, and a concave reflector in that portion of the box housing the illuminating means and associated with said illuminating means to direct light therefrom forwardly through the open bottom of the box.

9. An illuminating means for auditoriums comprising an elongated closure having top, ends and sides closed and the bottom open, elongated reflecting means within the closure in fixed relation thereto, said reflecting means being located adjacent to the top and extended down the sides of the closure, a source of light within the closure near one end thereof and below the reflecting means, and other reflecting means associated with the source of light to cause the light to be projected directly through the open bottom of the closure in the general direction of the length of the closure toward the front thereof.

10. Illuminating means for auditoriums comprising an elongated closure tapering in depth from one end toward the other and having the top, sides and ends closed with the bottom open, a source of light within the closure near the larger end thereof; reflecting means within the closure adjacent to the top thereof and associated with the source of light to direct the light downwardly through the open bottom, and other reflecting means associated with the source of light to cause the direct projection of the light through the open bottom in the general direction of the length of the closure toward the front thereof.

11. Illuminating means for auditoriums comprising an elongated closure having the top, ends and sides closed and open through the bottom, one end of the closure having an elongated slot extending in the direction of the depth of the closure, a block provided with means associated with the slotted end of the closure for securing the block thereto in the adjusted positions, said block being provided with a longitudinal series of passages, a reflector having supporting means adapted to any one of the series of passages for holding the reflector in adjusted positions, and a source of light housed in the closure in operative relation to the reflector.

12. An illuminating means for auditoriums comprising an elongated box or casing with top, ends, and sides closed, and having an opening through the bottom occupying the major portion of the length of the box with the remainder of the bottom of the box closed, and said box where closed being of greater depth than at the other end with the sides tapering toward said other end, a source of light housed in the larger end of the box, elongated reflecting means within the box having reflecting surfaces diverging from a line close to and lengthwise of the top of the box to lower lines along the sides of the box, another reflector associated with the source of light to project the light through the open bottom of the box in the general direction of the length of the box, and supporting means for the box for suspending it in desired positions of inclination.

13. An illuminating means for auditoriums comprising an elongated box or casing with top, ends and sides closed and having an opening through the bottom occupying the major portion of the length of the box with the remainder of the bottom of the box closed, and said box where closed being of greater depth than at the other end with the sides tapering toward said other end, a source of light housed in the larger end of the box, an elongated reflecting means having divergent reflecting surfaces and lodged in the box adjacent to and below the top thereof, another reflector associated with the source of light to project the light through the open bottom of the box in the general direction of the length of the box, and supporting means for the box for suspending it in desired positions of inclination, the reflector associated with the source of light having means for its adjustment into different operative positions with reference to said source of light.

14. An illuminating means for auditoriums comprising an elongated box or casing having a top, ends and sides closed, and open at the bottom for the major portion of the length at one end, and the remainder of the box at the other end being closed at the bottom and there of greater depth than the portion of the box provided with the open bottom, said last-named portion tapering toward the other end of the box, and the deeper end of the box where provided with the closed bottom having an upstanding wall joining the side walls where tapering, a reflector with divergent reflecting surfaces lodged in the box adjacent to and beneath the top of the box and extending lengthwise thereof, a source of light housed in the closed end of the box, a reflector in said closed end of the box associated with the source of light to project the light through the open bottom in the general direction of the length of the box, said reflector being provided with an adjustable support for varying the relation of the reflector to the source of light, and suspending means for the box for supporting it in any desired degree of longitudinal inclination.

In testimony, that I claim the foregoing as my own, I have hereto affixed my signature in the presence of two witnesses.

FRANK G. McPHERSON.

Witnesses:
   DANIEL C. TIMMONS,
   V. TAKEAIDO.